(12) United States Patent
Sun et al.

(10) Patent No.: US 12,330,693 B2
(45) Date of Patent: Jun. 17, 2025

(54) SAFETY CONTROL METHOD AND APPARATUS FOR AUTONOMOUS DRIVING ASSISTANCE SYSTEM

(71) Applicant: Robert Bosch GmbH, Stuttgart (DE)

(72) Inventors: Ashton Sun, Jiangsu (CN); Jingyao Zhang, Jiangsu (CN); Peng Ge, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 18/166,716

(22) Filed: Feb. 9, 2023

(65) Prior Publication Data
US 2023/0271633 A1 Aug. 31, 2023

(30) Foreign Application Priority Data
Feb. 28, 2022 (CN) .......................... 202210190318.5

(51) Int. Cl.
*B60W 60/00* (2020.01)
*B60W 40/08* (2012.01)

(52) U.S. Cl.
CPC ........ *B60W 60/0059* (2020.02); *B60W 40/08* (2013.01); *B60W 60/0018* (2020.02); *B60W 2540/229* (2020.02)

(58) Field of Classification Search
CPC ......... B60W 60/0059; B60W 60/0018; B60W 40/08; B60W 2540/229
See application file for complete search history.

(56) References Cited

U.S. PATENT DOCUMENTS

| | | | |
|---|---|---|---|
| 9,463,797 B2 * | 10/2016 | Damerow | B60W 30/0956 |
| 9,886,632 B1 * | 2/2018 | Loveland | G09B 9/30 |
| 10,872,534 B2 * | 12/2020 | Clark | G06T 17/05 |
| 12,181,569 B2 * | 12/2024 | Lewis | G01S 13/003 |
| 2013/0261949 A1 * | 10/2013 | Eriksson | G05D 1/104 |
| | | | 701/300 |

* cited by examiner

*Primary Examiner* — Ramsey Refai
(74) *Attorney, Agent, or Firm* — Maginot, Moore & Beck LLP

(57) ABSTRACT

A safety control method for an autonomous driving assistance system includes: receiving a status signal regarding a driver so as to determine a reasonably foreseeable indirect misuse (RFIM) event; receiving a particular system event and/or system fault; and calculating, with reference to a degree of severity of the particular system event and/or system fault, a failure rate related to the reasonably foreseeable indirect misuse (RFIM) event, wherein it can be determined, on the basis of the failure rate, whether a safety of the intended functionality (SOTIF)-related residual risk in the autonomous driving assistance system is acceptable.

12 Claims, 1 Drawing Sheet

1000

```
┌──────────┐
│   S110   │
└────┬─────┘
     │
┌────┴─────┐
│   S120   │
└────┬─────┘
     │
┌────┴─────┐
│   S130   │
└──────────┘
```

SAFETY CONTROL METHOD AND APPARATUS FOR AUTONOMOUS DRIVING ASSISTANCE SYSTEM

This application claims priority under 35 U.S.C. § 119 to application no. CN 202210190318.5, filed on Feb. 28, 2022 in China, the disclosure of which is incorporated herein by reference in its entirety.

FIELD

The present disclosure relates to the field of vehicle safety control, and more particularly, to a safety control method and apparatus for an autonomous driving assistance system, a computer storage medium, a computer program product, and a vehicle.

BACKGROUND

With fast development of intelligent connected vehicles and autonomous vehicles, designing highly reliable and safe vehicle electronic systems is attracting increasing attention from various parties, and functional safety and the safety of the intended functionality are indispensable to system design of autonomous vehicles. ISO 26262 and ISO DIS 21448 are industry standards for functional safety and the safety of the intended functionality of automotive electronic/electrical systems. The functional safety refers to "the absence of unreasonable risk due to hazards caused by malfunctioning behavior of electronic/electrical systems". That is, the functional safety focuses on whether the system, after systematic failures, can enter a safe state to avoid greater hazards, or reduce the probability of occurrence of hazards by means of safety measures, rather than the original function or performance of the system. The safety of the intended functionality refers to "the absence of unreasonable risk due to hazards caused by functional insufficiencies of the intended functionality or by foreseeable misuse by persons". That is, the safety of the intended functionality focuses on the functional insufficiencies of the intended functionality at the vehicle level, performance limitation of electronic/electrical elements in the system, and misuse by drivers, rather than hazards resulting from failures of electronic/electrical systems. Therefore, for the reliability and safety of an autonomous driving assistance system, the relevant assistance functions must comply with both of the above two standards.

For certain level-2 driving assistance functions, driver misuse does not directly result in hazards. Most likely, the driver misuse is combined with another system fault that occurs at the same time, so as to result in potential hazards, which essentially relates to the subject of the safety of the intended functionality (SOTIF).

ISO 26262 recommends using FTA to perform quantitative analysis on random hardware failures. However, no feasible quantitative analysis method is currently available for safety of the intended functionality (SOTIF)-related residual risks, so that it is difficult to implement the safety of the intended functionality in an actual project development process, thereby affecting the final product delivery quality.

SUMMARY

According to an aspect of the present disclosure, provided is a safety control method for an autonomous driving assistance system, comprising: receiving a status of a driver, so as to determine a reasonably foreseeable indirect misuse (RFIM) event; receiving a particular system event and/or system fault; and calculating, with reference to a degree of severity of the particular system event and/or system fault, a failure rate related to the reasonably foreseeable indirect misuse (RFIM) event, wherein it can be determined, on the basis of the failure rate, whether a safety of the intended functionality (SOTIF)-related residual risk in the autonomous driving assistance system is acceptable.

As an addition or alternative to the above solution, the above method further comprises: changing from a first human-machine interaction process in the autonomous driving assistance system to a second human-machine interaction process on the basis of the failure rate, and/or adjusting the reliability of the autonomous driving assistance system on the basis of the failure rate.

As an addition or alternative to the above solution, in the above method, the reasonably foreseeable indirect misuse (RFIM) event comprises: the driver being inattentive; the driver getting drowsy; and the driver not being present within the field of view of a driver monitoring system (DMS).

As an addition or alternative to the above solution, in the above method, the particular system event comprises: a vehicle being about to exceed a defined range of an operational design domain; and a vehicle being about to travel into an adjacent lane.

As an addition or alternative to the above solution, in the above method, calculating, with reference to a degree of severity of the particular system event and/or system fault, a failure rate related to the reasonably foreseeable indirect misuse (RFIM) event comprises: calculating the failure rate according to the following formula:

$$\lambda = \text{risk}_{factor} * \frac{RFIM_{TTI}}{3600\,s},$$

wherein $\lambda$ represents the failure rate, riskfactor represents a risk assessment factor determined according to the degree of severity of the particular system event and an exposure rating, and RFIM_TTI is a tolerant time interval for a reasonably foreseeable indirect misuse, and represents a time span from occurrence of a reasonably foreseeable indirect misuse (RFIM) event to the time when the vehicle enters a safe state.

As an addition or alternative to the above solution, in the above method, sharply braking the vehicle for a short time causes the vehicle to enter the safe state.

As an addition or alternative to the above solution, in the above method, changing from a first human-machine interaction process in the autonomous driving assistance system to a second human-machine interaction process on the basis of the failure rate comprises: shortening a tolerant time interval for a reasonably foreseeable indirect misuse in the first human-machine interaction process if the failure rate exceeds a system safety requirement.

As an addition or alternative to the above solution, in the above method, adjusting the reliability of the autonomous driving assistance system on the basis of the failure rate comprises: increasing a detection accuracy rate of a driver monitoring system (DMS) if the failure rate exceeds a system safety requirement.

According to another aspect of the present disclosure, provided is a safety control apparatus for an autonomous driving assistance system, comprising: a first receiving device, for receiving a status of a driver, so as to determine a reasonably foreseeable indirect misuse (RFIM) event; a second receiving device, for receiving a particular system event and/or system fault; and a calculating device, for calculating, with reference to a degree of severity of the particular system event and/or system fault, a failure rate related to the reasonably foreseeable indirect misuse (RFIM) event, wherein it can be determined, on the basis of the failure rate, whether a safety of the intended functionality (SOTIF)-related residual risk in the autonomous driving assistance system is acceptable.

As an addition or alternative to the above solution, the above apparatus further comprises: an adjustment device, for changing from a first human-machine interaction process in the autonomous driving assistance system to a second human-machine interaction process on the basis of the failure rate, and/or for adjusting the reliability of the autonomous driving assistance system on the basis of the failure rate.

As an addition or alternative to the above solution, in the above apparatus, the reasonably foreseeable indirect misuse (RFIM) event comprises: the driver being inattentive; the driver getting drowsy; and the driver not being present within the field of view of a driver monitoring system (DMS).

As an addition or alternative to the above solution, in the above apparatus, the particular system event comprises: a vehicle being about to exceed a defined range of an operational design domain; and a vehicle being about to travel into an adjacent lane.

As an addition or alternative to the above solution, in the above apparatus, the calculating device calculates the failure rate according to the following formula:

$$\lambda = \text{risk}_{factor} * \frac{RFIM_{TTI}}{3600\,s},$$

wherein λ represents the failure rate, riskfactor represents a risk assessment factor determined according to the degree of severity of the particular system event and an exposure rating, and RFIM_TTI is a tolerant time interval for a reasonably foreseeable indirect misuse, and represents a time span from occurrence of a reasonably foreseeable indirect misuse (RFIM) event to the time when the vehicle enters a safe state.

As an addition or alternative to the above solution, in the above apparatus, sharply braking the vehicle for a short time causes the vehicle to enter the safe state.

As an addition or alternative to the above solution, in the above apparatus, the adjustment device is configured to shorten a tolerant time interval for a reasonably foreseeable indirect misuse in the first human-machine interaction process if the failure rate exceeds a system safety requirement.

As an addition or alternative to the above solution, in the above apparatus, the adjustment device is configured to increase a detection accuracy rate of a driver monitoring system (DMS) if the failure rate exceeds a system safety requirement.

According to yet another aspect of the present disclosure, provided is a computer storage medium, comprising an instruction, wherein the instruction, when being run, implements the above method.

According to yet another aspect of the present disclosure, provided is a computer program product, comprising a computer program, wherein the computer program, when executed by a processor, implements the above method.

According to yet another aspect of the present disclosure, provided is a vehicle, comprising the above apparatus.

In the safety control solution for an autonomous driving assistance system according to the embodiments of the present disclosure, a status signal regarding a driver is received, so as to determine a reasonably foreseeable indirect misuse (RFIM) event, and a failure rate related to the reasonably foreseeable indirect misuse (RFIM) event is calculated with reference to a degree of severity of a received particular system event and/or system fault, so as to determine whether a safety of the intended functionality (SOTIF)-related residual risk in the autonomous driving assistance system is acceptable. This solution enables safety experts and developers to quantitatively (rather than qualitatively) assess a SOTIF-related risk, so as to determine as required, according to the failure rate, whether system design needs to be modified.

BRIEF DESCRIPTION OF THE DRAWINGS

The foregoing and other objectives and advantages of the present disclosure will be made more complete and clearer from the following detailed description provided with reference to the accompanying drawings, wherein the same or similar elements use the same reference numerals.

DETAILED DESCRIPTION

In the following, a safety control solution for an autonomous driving assistance system according to various exemplary embodiments of the present disclosure will be described in detail with reference to the accompanying drawings.

Figure 1:
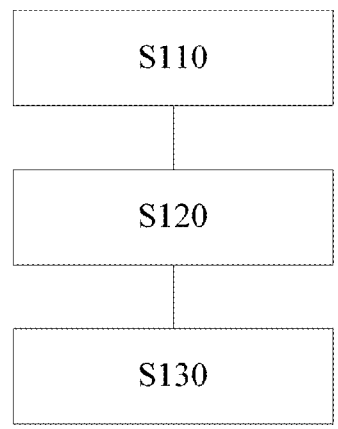
FIG. 1 shows a schematic flowchart of a safety control method for an autonomous driving assistance system according to an embodiment of the present disclosure.

FIG. 1 shows a schematic flowchart of a safety control method 1000 for an autonomous driving assistance system according to an embodiment of the present disclosure. As shown in FIG. 1, the safety control method 1000 for an autonomous driving assistance system includes the following steps:

step S110, receiving a status signal regarding a driver, so as to determine a reasonably foreseeable indirect misuse (RFIM) event;

step S120, receiving a particular system event and/or system fault; and step S130, calculating, with reference to a degree of severity of the particular system event and/or system fault, a failure rate related to the reasonably foreseeable indirect misuse (RFIM) event, wherein it can be determined, on the basis of the failure rate, whether a safety of the intended functionality (SOTIF)-related residual risk in the autonomous driving assistance system is acceptable.

In one or more embodiments of the present disclosure, the "autonomous driving assistance system" may be an ADAS system, i.e., an advanced driver assistance system, which, at any time during traveling of a vehicle, utilizes various sensors (a millimeter-wave radar, a lidar, a monocular/binocular camera, and satellite navigation) installed on the vehicle to sense the surrounding environment, acquire data, and identify, detect, and track static and dynamic objects, and performs system computation and analysis with reference to navigation map data, so as to enable the driver to perceive a potential danger in advance, thereby effectively improving the comfort and safety of vehicle driving.

In the context of the present disclosure, the term "RFIM" refers to reasonably foreseeable indirect misuse. A reasonably foreseeable indirect misuse (RFIM) behavior/event does not directly cause a hazard, but may be combined with another system fault that occurs at the same time so as to cause a potential hazard.

In step S110, a status of a driver is received, so as to determine a reasonably foreseeable indirect misuse (RFIM) event. Generally, the status of a driver can be analyzed comprehensively according to driving behaviors, driving styles, vehicle characteristics, environmental conditions, etc., and can also be inferred from physiological factors, external expressions, and emotional factors. In an embodiment, a driver monitoring system (DMS) can be used to detect the status of the driver or receive information related to the status of the driver.

In an embodiment, the reasonably foreseeable indirect misuse (RFIM) event includes: the driver being inattentive; the driver getting drowsy; and the driver not being present within the field of view of the driver monitoring system (DMS). Therefore, in this embodiment, the purpose of monitoring or surveillance performed by the driver monitoring system is to detect distraction, fatigue, or drowsiness of the driver and to monitor for a situation when the driver is not within the field of view of the driver monitoring system (DMS), for example, when cheating the driving assistance system by placing mineral water instead of the hands on the steering wheel, or when quarreling and fighting with a passenger, or the like. In the research and development stage of autonomous driving, monitoring drivers can provide first-hand data of driving behaviors, which can even be used in emulation and simulation systems.

A non-intrusive method is the preferred method to be used by the driver monitoring system, and a vision-based system is especially attractive. Primary visual cues include facial features, hand features, or body features. As an example, the driver monitoring system may be a real-time system that investigates the physical and psychological statuses of the driver on the basis of facial image processing performed on the driver. The driver monitoring system can detect the status of the driver according to closing of the eyelids, blinking, the direction of gaze, yawning, head movement, etc. For example, extracted symptoms related to fatigue, distraction, and drowsiness include: 1) symptoms associated with the ocular region: eye closing, the distance between the eyelids, rapid blinking, the direction of gaze, and saccadic eye movements; 2) symptoms associated with the mouth region: opening/closing; 3) symptoms associated with the head: nodding, the orientation of the head, and the head being motionless; and 4) symptoms associated with the face: mainly expressions.

In step S120, a particular system event and/or system fault is received. Here, the particular system event may include: a vehicle being about to exceed a defined range of an operational design domain (ODD); and a vehicle being about to travel into an adjacent lane. It can be understood that the degree of severity of a vehicle being about to travel into an adjacent lane is greater than the degree of severity of a vehicle being about to exceed a defined range of an operational design domain (ODD). Similarly, different system faults can be detected by sensor-level and system-level software and hardware monitoring, and can be distinguished according to the degrees of severity.

In step S130, with reference to a degree of severity of the particular system event and/or system fault, a failure rate related to the reasonably foreseeable indirect misuse (RFIM) event is calculated. For example, step S130 may include calculating the failure rate according to the following formula:

$$\lambda = \text{risk}_{factor} * \frac{RFIM_{TTI}}{3600\,s}, \qquad \text{(equation 1)}$$

wherein $\lambda$ represents the failure rate, riskfactor represents a risk assessment factor determined according to the degree of severity of the particular system event and an exposure rating, and RFIM_TTI is a tolerant time interval for a reasonably foreseeable indirect misuse, and represents a time span from occurrence of a reasonably foreseeable indirect misuse (RFIM) event to the time when the vehicle enters a safe state.

In an embodiment, for a certain driving assistance function, regarding a slight system fault or a particular event in which the vehicle is going to exceed a defined range of an operational design domain (ODD), if the exposure rating is assumed to be 3, it can be determined that the range of the risk assessment (calculation) factor riskfactor is from 0.01 to 0.1. In addition, for said driving assistance function, when the slight system fault or the particular event in which the vehicle is going to exceed a defined range of an operational design domain (ODD) occurs, the tolerant time interval for a reasonably foreseeable indirect misuse is 16 s, so that the finally acquired range of the failure rate $\lambda$ is from $4\times10^{-5}$ to $4\times10^{-4}$/h.

In another embodiment, for a certain driving assistance function, regarding a primary system fault or a particular event in which the vehicle is going to travel into an adjacent lane, if the exposure rating is assumed to be 3, it can be determined that the range of the risk assessment (calculation) factor riskfactor is 0.1. In addition, for said driving assistance function, when the primary system fault or the particular event in which the vehicle is going to travel into an adjacent lane occurs, the tolerant time interval for a reasonably foreseeable indirect misuse is 4 s, so that the finally acquired range of the failure rate $\lambda$ is $1\times10^{-4}$/h.

RFIM_TTI is the tolerant time interval for a reasonably foreseeable indirect misuse, and represents a time span from occurrence of a reasonably foreseeable indirect misuse (RFIM) event to the time when the vehicle enters a safe state (after intervention) (or represents, in the absence of a misuse intervention mechanism, a time span from occurrence of a reasonably foreseeable indirect misuse (RFIM) event to the time when a situation or event resulting in a hazard event occurs). For example, driver misuse (for example, the line of sight of the driver is moved away from the road) is similar to a dormant failure defined by ISO 26262. If no driver misuse prevention mechanism is implemented in the autonomous driving assistance system, then after a certain time (an RFIM time), a second fault will occur in the system. Such kind of fault may be that the vehicle travels into an adjacent lane. In this case, the fault results in potential danger (e.g., collision with a vehicle in an adjacent lane or across a road fence), because the driver does not monitor road conditions actively, and cannot take over promptly. In this case, an RFIM duration varies greatly, specifically depending on a road segment in which the ego-vehicle is traveling, in-vehicle sensors, and vehicle performance.

Different from the above example, in another example, a safety mechanism may be implemented (for example, a driver monitoring system (DMS) is employed) in the autonomous driving assistance system so as to prevent driver misuse. The DMS typically has a de-dithering time (e.g., 300 ms to 500 ms) corresponding to an RFIM detection time interval (RFIM-DTI). Upon detection of driver misuse, a corresponding system response is triggered before a safe state is reached. This period of time is referred to as an RFIM reaction time interval (RFIM-RTI). A total RFIM handling time interval (RFIM-HTI) is the sum of the RFIM-DTI and the RFIM-RTI, and should be shorter than a time span from occurrence of a reasonably foreseeable indirect misuse (RFIM) event to the time when a situation or event resulting in a hazard event occurs in the absence of a misuse intervention mechanism.

In addition, the so-called "safe state" refers to a safe operation mode free of risks at an unreasonable level caused by a certain fault. In an embodiment, a feasible safe state of the system may be sudden (short-time) braking for alerting the driver, so that he/she restores manual control of the vehicle. This is because sharp braking has been proven to be one of the most effective measures to make the driver resume the driving task.

In an embodiment, although not shown in FIG. 1, the above method 1000 further includes: changing from a first human-machine interaction process in the autonomous driving assistance system to a second human-machine interaction process on the basis of the failure rate, and/or adjusting the reliability of the autonomous driving assistance system on the basis of the failure rate.

For example, the first human-machine interaction process may be as follows: upon detecting a driver misuse event, and upon detecting a slight system fault or the vehicle being about to exceed a defined range of an operational design domain (ODD), the autonomous driving assistance system still continues performing full function operation for a period of time t (e.g., 3 s), and then if the above conditions are still met (that is, the driver misuse event is detected, and the slight system fault or the vehicle being about to exceed the defined range of the operational design domain (ODD) is detected), multiple levels of alerts are triggered in sequence. For example, first, a first-level alert (for example, an alert issued by means of a text message on a screen) is triggered in a first time period T1, and if no improvement occurs, then a second-level alert is further triggered in a second time period T2 (for example, the system triggers a take-over request by means of a flickering status bar on the steering wheel, an icon on the dashboard, and a swooshing sound). Then, if the conditions are still met, then the system enhances all of the second-level alerts by increasing the frequencies and volumes thereof in a third time period T3. Then, if there is still no effect, then a transient and sudden braking impact is triggered in a fourth time period T4 to alert the driver. Finally, safe vehicle stopping is triggered in the system in a fifth time period T5. That is, the vehicle is stopped in the current lane at a relatively low deceleration rate. It can be understood that in the above human-machine interaction process, the tolerant time interval for a reasonably foreseeable indirect misuse RFIM_TTI=t+T1+T2+T3 (note: the detection time interval is not taken into consideration).

If the failure rate calculated according to equation (1) is greater than a failure rate allowable by system safety (i.e., exceeding the system safety requirement), it may be considered to shorten the tolerant time interval for a reasonably foreseeable indirect misuse in the first human-machine interaction process. In the above embodiment, it may be considered to shorten any one of t, T1, T2, and T3.

In another embodiment, the reliability of the autonomous driving assistance system may be adjusted on the basis of the failure rate. For example, if the failure rate exceeds a system safety requirement, a detection accuracy rate of the driver monitoring system (DMS) is increased (for example, improving a detection algorithm of a sensor, utilizing a sensor having higher precision, and so on).

That is, when such quantitative failure rate is employed to assess a safety of the intended functionality (SOTIF)-related residual risk, safety experts and developers are enabled to make a clear decision on this risk, so that system design can be adaptively adjusted as required.

Additionally, it would be readily appreciated by those skilled in the art that the safety control method for an autonomous driving assistance system provided by one or more embodiments of the present disclosure may be implemented by a computer program. For example, the computer program is included in a computer program product, and when executed by a processor, the computer program implements the safety control method for an autonomous driving assistance system according to one or more embodiments of the present disclosure. For another example, when a computer storage medium (e.g., a USB flash drive) storing the computer program is connected to a computer, the safety control method for an autonomous driving assistance system according to one or more embodiments of the present disclosure can be implemented by executing the computer program.

Figure 2:
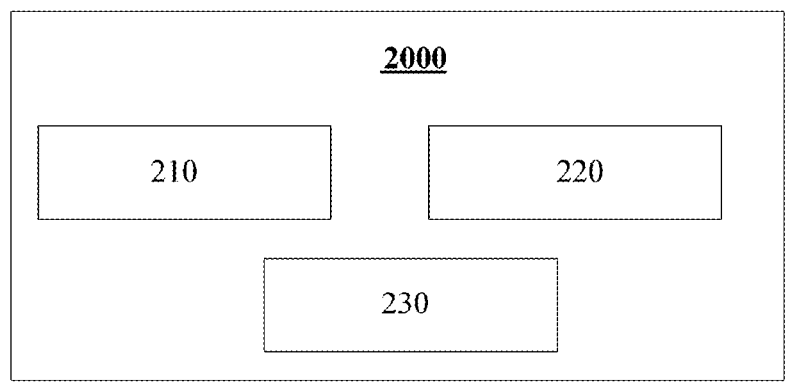
FIG. 2 shows a schematic structural view of a safety control apparatus for an autonomous driving assistance system according to an embodiment of the present disclosure.

Referring to FIG. 2, FIG. 2 shows a schematic structural view of a safety control apparatus 2000 for an autonomous driving assistance system according to an embodiment of the present disclosure. As shown in FIG. 2, the safety control apparatus 2000 for an autonomous driving assistance system includes: a first receiving device 210, a second receiving device 220, and a calculating device 230. The first receiving device 210 is for receiving a status signal regarding a driver, so as to determine a reasonably foreseeable indirect misuse (RFIM) event. The second receiving device 220 is for receiving a particular system event and/or system fault. The calculating device 230 is for calculating, with reference to a degree of severity of the particular system event and/or system fault, a failure rate related to the reasonably foreseeable indirect misuse (RFIM) event, wherein it can be determined, on the basis of the failure rate, whether a safety of the intended functionality (SOTIF)-related residual risk in the autonomous driving assistance system is acceptable.

Although not shown in FIG. 2, in an embodiment, the above apparatus 2000 further includes: an adjustment device, for changing from a first human-machine interaction process in the autonomous driving assistance system to a second human-machine interaction process on the basis of the failure rate, and/or for adjusting the reliability of the autonomous driving assistance system on the basis of the failure rate.

Those skilled in the art could understand that the above apparatus 2000 can be integrated into various vehicles or (in-vehicle) test apparatuses.

To sum up, in the safety control solution for an autonomous driving assistance system according to the embodiments of the present disclosure, a status of a driver is received, so as to determine a reasonably foreseeable indirect misuse (RFIM) event, and a failure rate related to the reasonably foreseeable indirect misuse (RFIM) event is calculated with reference to a degree of severity of a received particular system event and/or system fault, so as to determine whether a safety of the intended functionality (SOTIF)-related residual risk in the autonomous driving assistance system is acceptable. This solution enables safety experts and developers to quantitatively (rather than qualitatively) assess a SOTIF-related risk, so as to determine as required, according to the failure rate, whether system design needs to be modified. The safety control solution for an autonomous driving assistance system according to the embodiments of the present disclosure not only ensures an intelligent driving system to meet reliability and safety requirements, but also facilitates shortening of a development cycle of an autonomous driving assistance system.

Although the above specification describes only some embodiments of the present disclosure, it would be appreciated by those of ordinary skill in the art that the present disclosure can be implemented in many other forms without departing from the spirit or scope thereof. Therefore, the illustrated examples and embodiments are considered to be illustrative.

The invention claimed is:

1. A safety control method for an autonomous driving assistance system, comprising:
   receiving a status signal regarding a driver so as to determine a reasonably foreseeable indirect misuse (RFIM) event;
   receiving a particular system event and/or system fault; and
   calculating, with reference to a degree of severity of the particular system event and/or system fault, a failure rate related to the RFIM event; and
   determining, on the basis of the failure rate, whether a safety of the intended functionality (SOTIF)-related residual risk in the autonomous driving assistance system is acceptable.

2. The method according to claim 1, further comprising:
   changing from a first human-machine interaction process in the autonomous driving assistance system to a second human-machine interaction process on the basis of the failure rate;
   and/or adjusting a reliability of the autonomous driving assistance system on the basis of the failure rate.

3. The method according to claim 1, wherein the RFIM event comprises one of more of the following:
   the driver being inattentive;
   the driver getting drowsy; and
   the driver not being present within the field of view of a driver monitoring system (DMS).

4. The method according to claim 1, wherein the particular system event and/or system fault comprises one or more of:
   a vehicle being about to exceed a defined range of an operational design domain; and
   a vehicle being about to travel into an adjacent lane.

5. The method according to claim 4, wherein the calculating of the failure rate related to the RFIM event comprises:
   calculating the failure rate according to the formula:

$$\lambda = \text{risk}_{factor} * \frac{RFIM_{TTI}}{3600 \, s},$$

wherein $\lambda$ represents the failure rate, risk_factor represents a risk assessment factor determined according to the degree of severity of the particular system event and an exposure rating, and $RFIM_{TTI}$ is a tolerant time interval for a reasonably foreseeable indirect misuse, and represents a time span from occurrence of the RFIM event to the time when the vehicle enters a safe state.

6. The method according to claim 5, wherein sharply braking the vehicle for a short time causes the vehicle to enter the safe state.

7. The method according to claim 2, wherein the changing from the first human-machine interaction process to the second human-machine interaction process comprises:
   shortening a tolerant time interval for a reasonably foreseeable indirect misuse in the first human-machine interaction process if the failure rate exceeds a system safety requirement.

8. The method according to claim 2, wherein the adjusting of the reliability of the autonomous driving assistance system on the basis of the failure rate comprises:
   increasing a detection accuracy rate of a driver monitoring system (DMS) if the failure rate exceeds a system safety requirement.

9. A safety control apparatus for an autonomous driving assistance system, comprising:
   a first receiving device configured to receive a status signal regarding a driver and to determine a reasonably foreseeable indirect misuse (RFIM) event;
   a second receiving device configured to receive a particular system event and/or system fault; and
   a calculating device configured to calculate, with reference to a degree of severity of the particular system event and/or system fault, a failure rate related to the RFIM event and to determine, on the basis of the failure rate, whether a safety of the intended functionality (SOTIF)-related residual risk in the autonomous driving assistance system is acceptable.

10. A non-transitory computer storage medium, comprising program instructions configured to implement the method according to claim 1.

11. A computer program product comprising:
   a computer program configured to be executed by a processor to implement the method according to claim 1.

12. A vehicle comprising:
   a safety control apparatus for an autonomous driving assistance system, comprising:
      a first receiving device configured to receive a status signal regarding a driver and to determine a reasonably foreseeable indirect misuse (RFIM) event;
      a second receiving device configured to receive a particular system event and/or system fault; and
      a calculating device configured to calculate, with reference to a degree of severity of the particular system event and/or system fault, a failure rate related to the RFIM event and to determine, on the basis of the failure rate, whether a safety of the intended functionality (SOTIF)-related residual risk in the autonomous driving assistance system is acceptable.

* * * * *